(12) United States Patent
Jiang

(10) Patent No.: US 12,128,658 B2
(45) Date of Patent: Oct. 29, 2024

(54) METHOD OF PREPARING A FUNCTIONAL LAMINATE

(71) Applicant: Essilor International, Charenton-le-Pont (FR)

(72) Inventor: Peiqi Jiang, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 153 days.

(21) Appl. No.: 17/802,477

(22) PCT Filed: Feb. 25, 2021

(86) PCT No.: PCT/EP2021/054639
§ 371 (c)(1),
(2) Date: Aug. 25, 2022

(87) PCT Pub. No.: WO2021/170696
PCT Pub. Date: Sep. 2, 2021

(65) Prior Publication Data
US 2023/0141566 A1 May 11, 2023

(30) Foreign Application Priority Data
Feb. 26, 2020 (EP) .................................... 20305181

(51) Int. Cl.
*B29C 65/00* (2006.01)
*B29C 45/14* (2006.01)
(Continued)

(52) U.S. Cl.
CPC .............. *B32B 27/40* (2013.01); *B29C 45/14* (2013.01); *B32B 27/365* (2013.01); *B32B 37/10* (2013.01);
(Continued)

(58) Field of Classification Search
CPC ........................... B29C 65/48; B29C 65/4815
See application file for complete search history.

(56) References Cited

U.S. PATENT DOCUMENTS

| 2004/0096666 A1 | 5/2004 | Knox et al. |
| 2004/0126587 A1 | 7/2004 | Maki et al. |
| 2018/0050507 A1 | 2/2018 | Allso |

FOREIGN PATENT DOCUMENTS

| CN | 104684953 | 6/2015 |
| CN | 107889497 | 4/2018 |

(Continued)

OTHER PUBLICATIONS

Office Action issued in corresponding Chinese Application No. 202180012546.7, dated Dec. 12, 2023.
(Continued)

*Primary Examiner* — Philip C Tucker
*Assistant Examiner* — Nickolas R Harm
(74) *Attorney, Agent, or Firm* — Norton Rose Fulbright US LLP

(57) ABSTRACT

The present disclosure relates to a method of preparing a laminate or a laminated lens, comprising obtaining a first plastic substrate having a front surface and a back surface, treating the front surface of the first plastic substrate or the back surface of the first plastic substrate, and laminating a second plastic substrate on the treated front surface of the first plastic substrate or the treated back surface of the first plastic substrate. The treating may include applying a polyurethane resin to a surface of the first plastic substrate. The method may further comprise treating a surface of the second plastic substrate. The method may further comprise applying activator to the treated surfaces of the first plastic substrate and the second plastic substrate and laminating by apposing the treated surfaces of the first plastic substrate and the second plastic substrate.

14 Claims, 8 Drawing Sheets

(51) Int. Cl.
    *B32B 27/36*      (2006.01)
    *B32B 27/40*      (2006.01)
    *B32B 37/10*      (2006.01)
    *B29C 65/48*      (2006.01)
    *B29K 69/00*      (2006.01)
    *B29K 75/00*      (2006.01)

(52) U.S. Cl.
    CPC .......... *B29C 65/48* (2013.01); *B29C 65/4815* (2013.01); *B29K 2069/00* (2013.01); *B29K 2075/00* (2013.01)

(56) References Cited

FOREIGN PATENT DOCUMENTS

| | | |
|---|---|---|
| EP | 3575076 B2 | 12/2019 |
| WO | WO 2019/038613 | 2/2019 |

OTHER PUBLICATIONS

International Search Report and Written Opinion issued in Corresponding PCT Application No. PCT/EP2021/054639, dated May 11, 2021.

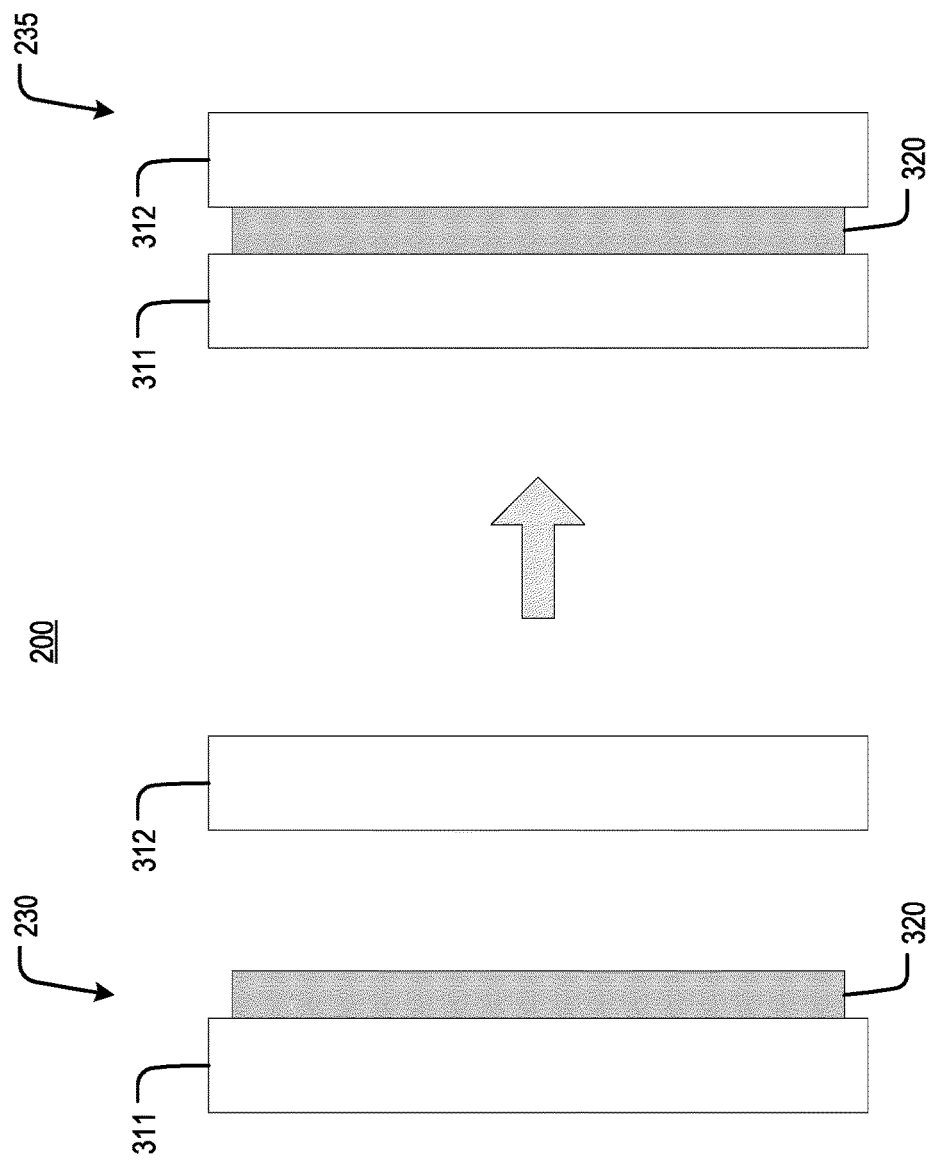

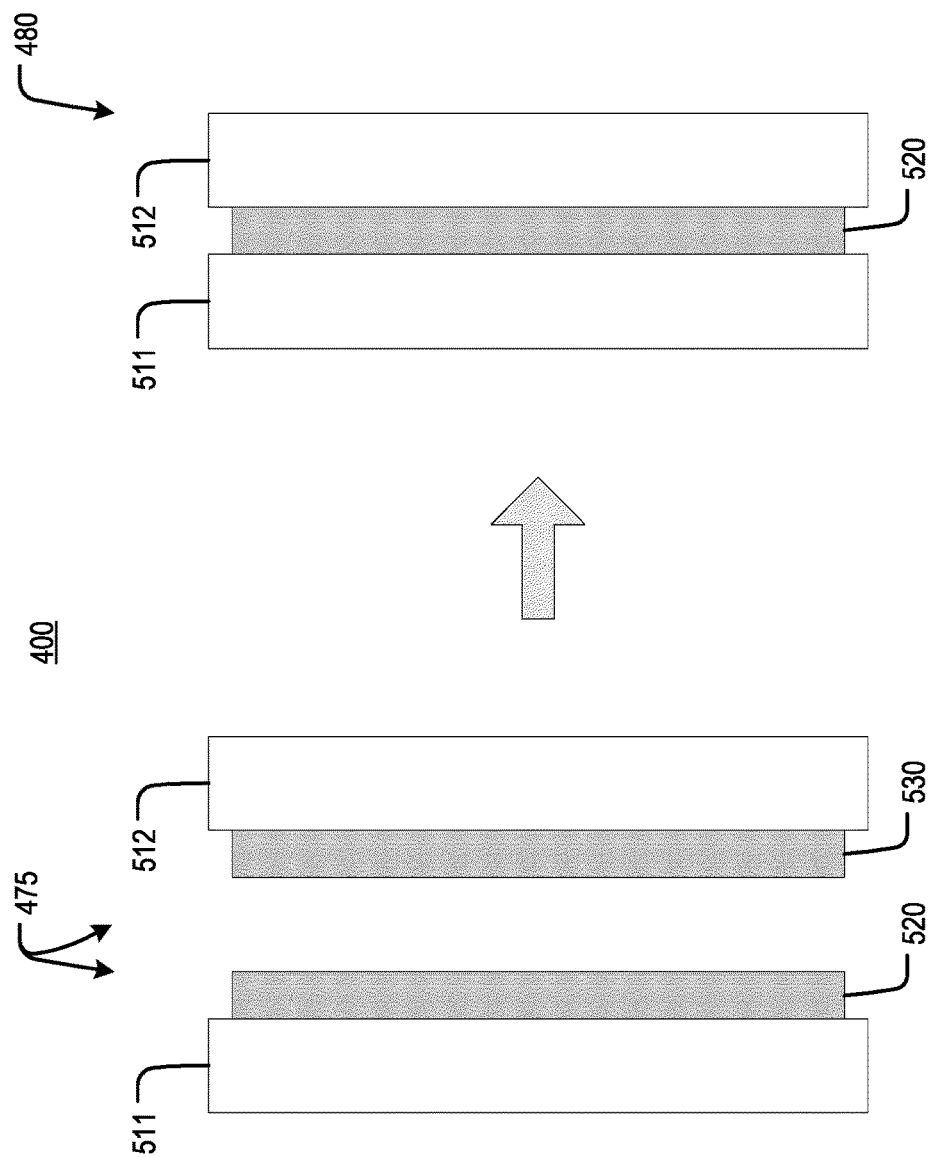

| TPU Laminate | Adhesion Types | Drying | Adhesion Level |
|---|---|---|---|
| PC-TPU-TPU-PC | IPA | Room Temp for 24 hrs | > 50N/inch |
| PC-TPU-TPU-PC | IPA + $H_2O$ | Room Temp for 24 hrs | > 25N/inch |
| PC-TPU-TPU-PC | Methanol | Room Temp for 24 hrs | > 50N/inch |
| PC-TPU-PC | IPA | Room Temp for 24 hrs | > 15N/inch |
| PC-TPU-TPU-PC | $H_2O$ | Room Temp for 24 hrs | 0 N/inch |
| PC-TPU-TPU-PC | Corona + $H_2O$ | Room Temp for 24 hrs | 0 N/inch |
| PC-TPU-TPU-PC | IPA + $H_2O$-based HMA | Room Temp for 24 hrs | 0 N/inch |

FIG. 6

METHOD OF PREPARING A FUNCTIONAL LAMINATE

CROSS-REFERENCE TO RELATED APPLICATIONS

This application is a national phase application under 35 U.S.C. § 371 of International Application No. PCT/EP2021/054639 filed 25 Feb. 2021, which claims priority to European Patent Application No. 20305181.8 filed 26 Feb. 2020. The entire contents of each of the above-referenced disclosures is specifically incorporated by reference herein without disclaimer.

BACKGROUND

Field of the Disclosure

The present disclosure relates to a functional laminate and, in particular, functional thermoplastic polyurethane laminates for optical devices and optical lens applications.

Description of the Related Art

A functional film and/or a photochromic film can be used to add protection or various optical properties to an optical device and lens. A functional film may provide mechanical and general functional properties such as polarization, color, ultraviolet protection, blue cut properties, photochromic properties, and/or electrochromic properties. A photochromic film may provide photochromic properties. Due to its soft texture, however, each side of a functional film and/or photochromic film is typically laminated with an optical thermoplastic film to provide necessary rigidity for further processing and applications. For instance, when implemented within a curved surface of an optical lens, the produced polymeric laminate must have integrity sufficient to ensure adhesion between the thermoplastic films of the laminate and avoid peeling or delamination thereof during cutting and forming.

Such adhesion between the functional film and/or photochromic film and the optical thermoplastic film is typically achieved by the use of an adhesive. Often times, the adhesive may be cured by the use of either thermal or ultraviolet (UV) curing processes. For example, commercially available adhesives such as UV curable acrylic-based adhesives and polyurethane based adhesives have been used to bond the functional film and/or photochromic film to thermoplastic films in laminates. In some cases, though requiring complex processes and costly equipment, film treatments such as caustic treatment, plasma treatment, or corona treatment have been implemented.

These approaches, however, in addition to having high environmental impact, introduce limitations and drawbacks that impact their applicability. For instance, due to the sensitivity of certain functional films and/or photochromic films to moisture and heating, thermal curing at high temperatures (e.g., 80° C. to 100° C.) may generate bubbles and create cosmetic issues. In another instance, due to the sensitivity of certain functional films and/or photochromic films to UV light, UV curing may cause the films to yellow and present an off-putting aesthetic.

Therefore, while adhesives and methods exist for preparing a functional film-containing laminate, the need for improvements in this field persists in light of, at least, the aforementioned drawbacks of current approaches.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The present disclosure relates to a method of preparing a laminated optical device.

In an embodiment, the present disclosure further relates to a method of preparing a laminate or laminated lens, comprising obtaining a first plastic substrate having a front surface and a back surface, treating the front surface of the first plastic substrate or the back surface of the first plastic substrate, and laminating a second plastic substrate on the treated front surface of the first plastic substrate or the treated back surface of the first plastic substrate, wherein the treating includes applying a polyurethane resin to the front surface of the first plastic substrate or the back surface of the first plastic substrate, the applied polyurethane resin is a polyester polyurethane resin, a polyether polyurethane resin, or a polycaprolactone resin, and the treating includes applying isopropyl alcohol or methanol, in combination with water, to the applied polyurethane resin.

In an embodiment, the present disclosure further relates to a method of preparing a laminate or laminated lens, comprising obtaining a first plastic substrate having a front surface and a back surface, treating the front surface of the first plastic substrate or the back surface of the first plastic substrate, and laminating a second plastic substrate on the treated front surface of the first plastic substrate or the treated back surface of the first plastic substrate. The method further comprises treating a front surface of the second plastic substrate or a back surface of the second plastic substrate and the laminating includes apposing the treated front surface of the first plastic substrate or the treated back surface of the first plastic substrate and the treated front surface of the second plastic substrate or the treated back surface of the second plastic substrate, wherein the treating includes applying a polyurethane resin to the front surface of the first plastic substrate or the back surface of the first plastic substrate, applying a polyurethane resin to the front surface of the second plastic substrate or the back surface of the second plastic substrate, and applying isopropyl alcohol or methanol, in combination with water, to the applied polyurethane resin of the first plastic substrate and the applied polyurethane resin of the second plastic substrate.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 is an illustration of a flow diagram of a method of preparing a laminate or a laminated lens, according to an exemplary embodiment of the present disclosure;

FIG. 5 is an illustration of a flow diagram of a method of preparing a laminate or a laminated lens, according to an exemplary embodiment of the present disclosure; and FIG. 6 is a tabular representation of adhesion strength of a method of preparing a laminate or a laminated lens, according to an exemplary embodiment of the present disclosure.

DETAILED DESCRIPTION

Figure 1:
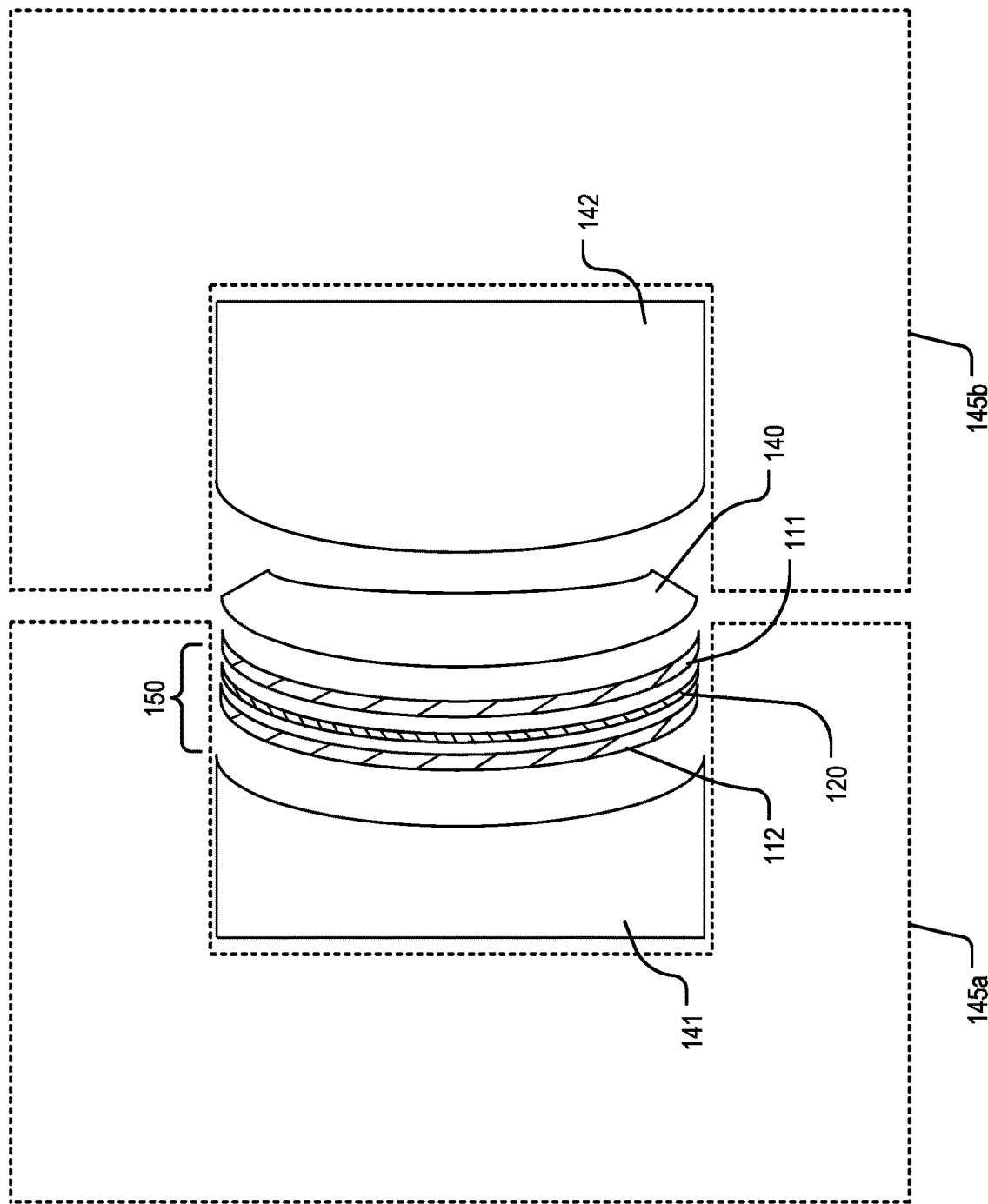
FIG. 1 is a schematic of a molding device, according to an embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The terms "about" and "approximately" are defined as being close to as understood by one of ordinary skill in the art. In one non-limiting embodiment the terms are defined to be within 10%, preferably, within 5%, more preferably, within 1%, and most preferably, within 0.5%.

The terms "laminate" and "laminated lens" or variations of these terms, when used in the claims and/or the specification, refer to a similar structure.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The process of the present disclosure can "comprise," "consist essentially of," or "consist of" particular ingredients, components, compositions, etc., disclosed throughout the specification.

The terms "first plastic substrate", "first plastic film" and "film A" may be used interchangeably in the specification and/or claims, but are intended to convey the same or similar materials. The terms "second plastic substrate", "second plastic film" and "film B" may be used interchangeably in the specification and/or claims, but are intended to convey the same or similar materials.

The terms "TPU photochromic film" and "TPU film" may be used interchangeably in the specification and/or claims, but are intended to convey the same or similar materials.

Functional films and/or photochromic films can be incorporated to add extra optical properties to an optical lens. Due to the typically soft texture of photochromic films and/or functional films, however, a thermoplastic film, such as a polycarbonate (PC) film or cellulose triacetate (TAC) film, is often laminated to both surfaces of the photochromic film and/or functional film to form a laminate with sufficient material strength to withstand the forming process when the laminate is incorporated on the surface of the optical lens. For example, thermoplastic polyurethane (TPU) photochromic film has a Shore A hardness of 45-85 and, therefore, needs to be laminated with a harder PC film or TAC film in order to form a laminate suitable for further lens integration.

To this end, FIG. 1 is a schematic of a molding device for incorporating the laminate on the surface of the optical lens. The molding device can include a first mold side 145a, a second mold side 145b, a concave mold insert 141, and a convex mold insert 142. The first mold side 145a and the second mold side 145b can each include a hollow portion, wherein the concave mold insert 141 and the convex mold insert 142 can be removably disposed therein. As shown in FIG. 1, the first mold side 145a including the concave mold insert 141 can be configured to couple with the second mold side 145b including the convex mold insert 142. Upon coupling, the concave mold insert 141 and the convex mold insert 142 can form a cavity connected to a hollow line formed by the coupling of the first and second mold sides 145a, 145b. The line can be configured to receive a polymer, for example, via a screw feeder or similar device. The cavity can be configured to receive a thermoformed laminate wafer 150. A curvature of the concave mold insert 141 and a curvature of the convex mold insert 142 can determine a lens power of the resulting lens. In an embodiment, the optical lens may include PC, polymethyl methacrylate (PMMA), polystyrene, polystyrene maleic anhydride, polyamide, thermoplastic urethane, thermoset polyurethane, polyester, copolyesters, polysulfone, cyclic olefin copolymers (OCO), polyphenyl oxide, allyl diglycol carbonate, polythiourethane, episulfur polymers, epoxy, poly(meth)acrylates, polythiomethacrylates, or combinations thereof. For a semi-finished lens, a curvature along a concave side of the lens is fixed and the convex side of the lens can be modified after molding, for example via grinding and polishing. Note that multiple lines for receiving the polymer can be connected, such that an injection of the polymer from a source can fill multiple mold devices with a single injection and allow for parallel fabrication of multiple lenses.

Prior to placement in the molding device and lens integration, a flat laminate wafer, formed according to the processes described and illustrated herein, can be thermoformed into the spherical dome shape of the thermoformed laminate wafer 150, for example via a thermoforming machine. During thermoforming, the flat laminate wafer can be placed onto a heated thermoforming insert, and a vacuum force can be applied to secure the flat laminate wafer to the thermoforming insert. By adjusting a temperature of the applied heat and a force of the applied vacuum, the flat laminate wafer can be formed to the curved shape of the thermoforming insert to produce the thermoformed laminate wafer 150.

In an embodiment, the flat laminate wafer, also referred to herein as a "functional laminate", "laminate", and "TPU laminate", among other obvious derivatives thereof, can include a first layer 111, a center layer 120, and a second layer 112. In an embodiment of the present disclosure, the first layer 111 may be a thermoplastic film, also referred to herein as "first plastic film", "film A", and "first plastic substrate", the center layer 120 may a functional film and/or photochromic film, and the second layer 112 may be a thermoplastic film, also referred to herein as "second plastic film", "film B", and "second plastic substrate". The flat laminate wafer will be described in further detail in the remainder of the disclosure. As shown in FIG. 1, however, thermoforming the flat laminate wafer can produce a curved structure with the first layer 111 being a concave side and the second layer 112 being a convex side. It may be appreciated that known devices and methods can be used to thermoform the flat laminate wafer, for example, a LEMA-manufactured machine that incrementally increases the curvature of the flat laminate wafer under applied heat.

There are several methods available that aim to generate the flat laminate wafer so that it may withstand the physical demands of the thermoforming process and the molding device. For instance, assuming the center layer 120 is a TPU photochromic film, several commercially available adhesives, such as UV curable acrylic-based adhesives or polyurethane-based adhesives may be used. However, these adhesives require either or both of UV curing or thermal curing which require curing energy and curing equipment, thus complicating the overall lamination process. Certain water-based hot melt adhesives used for TPU photochromic laminates with PC or TAC still require heat during lamination and, further, may require TPU photochromic film treatment prior to lamination.

Moreover, certain pressure-sensitive adhesives, such as tape and the like that do not require heat, water, or solvent, result in laminates with low material strength as determined by adhesion measurements (<15 N/inch), thus risking delamination during lens fabrication and integration.

Any alternative to the above largely relies on mass production capabilities, such as roll-to-roll film lamination processes that are not applicable in smaller settings such as a laboratory or clinic. Further, in order to ensure sufficient adhesion of, for instance, a laminate comprising a first plastic film, a functional film, and a second plastic film, roll-to-roll film lamination processes need to be completed nearly instantly, an outcome that is impracticable.

In view of the above, the present disclosure describes a functional laminate that can be used in injection molding or casting processes to allow for integration of the functional laminate with an optical lens, the functional laminate thereby providing improved photochromic performance and properties to a functional lens.

In an embodiment, the functional laminate comprises a TPU photochromic film. The functional laminate may be formed without heating, UV radiation, or film treatments such as corona treatment or plasma treatment.

According to an embodiment, a functional laminate, such as a photochromic laminate produced according to the methods described herein, demonstrates a rapid photochromic fading speed (i.e. $t_{0.5}$ under 30 seconds). Such a photochromic laminate has demonstrated good adhesion after injection molding, prescription surfacing, and hard coating.

According to an embodiment, the present disclosure describes a method of applying a functional TPU film onto a first plastic film, applying a functional TPU film onto a second plastic film, and laminating the first plastic film and the second plastic film under pressure at room temperature. Prior to laminating, the method may include adding alcohol, or alcohol and water, to the functional TPU film on the first plastic film and on the second plastic film. After several hours, a strongly-bonded functional TPU laminate may be obtained without additional energy costs or treatments. In an example, the first plastic film may be a PC film. In an example, the second plastic film may the same or different from the first plastic film. The second plastic film may be a PC film, as is the first plastic film, or may be a PMMA film or other different material from the first plastic film.

In an embodiment, the first plastic film may be a thermoplastic film having a functional TPU film applied thereto. In an example, the functional TPU film may comprise a photochromic dye, a blue light cut dye, a UV cut dye, an IR cut dye, or any other functional constituent. Accordingly, the functional TPU film may provide polarization, color, ultraviolet protection, and the like.

In an embodiment, the second plastic film may be a thermoplastic film having a functional TPU film applied thereto. In an example, the functional TPU film may comprise a photochromic dye, a blue light cut dye, a UV cut dye, an IR cut dye, or any other functional constituent. Accordingly, the functional TPU film may provide polarization, color, ultraviolet protection, and the like.

In an embodiment, the functional TPU film may be applied to the first plastic film and the second plastic film by means of, among others, extrusion, coating, and pre-lamination. The first plastic film and the second plastic film may each have a thickness between 20 μm and 10 mm. The functional TPU film may have a thickness between 0.5 μm and 500 μm.

According to an embodiment, the first plastic film and the second plastic film may each comprise photochromic dye, blue light cut dye, UV cut dye, IR cut dye, or any other functional components.

In an embodiment, the first plastic film and the second plastic film may be the same or different materials, each material selected from the group including PC, PMMA, TAC, OCO, polyethylene terephthalate (PET), and the like.

According to an embodiment, the method includes applying isopropyl alcohol (IPA), ethanol, methanol, IPA and water, ethanol and water, or methanol and water, to a surface of either or both of the first plastic film and the second plastic film.

According to an embodiment, the method includes applying pressure between 2 psi and 80 psi during lamination.

According to an embodiment, lamination may occur at room temperature (e.g. 25° C.) over a period of between 2 hours and 24 hours.

According to an embodiment, lamination results in an adhesion between layers of the TPU laminate of between 15 N/inch and 80 N/inch, or more preferably, in a range between 20 N/inch and 60 N/inch, or more preferably, in a range between 30 N/inch and 50 N/inch.

Returning now to the Figures, the methods described herein will be described with reference to FIG. 2A. Process 200 provides a flow diagram for generating a flat laminate wafer, as introduced in FIG. 1, without the need for heat curing, UV curing, and the like, wherein a functional TPU film is only applied to one of a first plastic film and a second plastic film.

At step 225 of process 200, a first plastic film, or first plastic substrate, having a front surface and a back surface, may be provided. In an embodiment, the first plastic film may be PC, PMMA, TAC, OCO, PET, polyamide Nylon, allyl diglycol carbonate, thio-urethane copolymer, poly-acrylate, poly-episulfide, polyepoxy, polyamide, or combinations thereof. At sub process 230 of process 200, the front surface of the first plastic film or the back surface of the first plastic film may be treated. In an embodiment, treatment may include application of a functional film and/or photochromic film that provides additional optical qualities such as a polarizing functional under specific wavelength. The functional film and/or photochromic film may be applied to the front surface of the first plastic film or the back surface of the first plastic film by extrusion, coating, pre-lamination, and the like. In an embodiment, treatment may include application of an activator to the front surface of the first plastic film or the back surface of the first plastic film. In an embodiment, treatment may include application of an activator to the applied function film and/or photochromic film. The activator may be, in an example, an alcohol similar to that which is used for sterilizing medical equipment. Sub process 230 of process 200 will be described in further detail with reference to FIG. 2B.

At step 235 of process 200, a second plastic film, or second plastic substrate, having a front surface and a back surface, may be provided and laminated with the treated surface of the first plastic film. In an embodiment, the second plastic film may be PC, PMMA, TAC, OCO, PET, polyamide Nylon, allyl diglycol carbonate, thio-urethane copolymer, poly-acrylate, poly-episulfide, polyepoxy, polyamide, or combinations thereof.

According to an embodiment, lamination may be performed at room temperature (e.g., 25° C.) and under a pressure of between 2 psi and 80 psi or, more preferably, between 2 psi and 30 psi. Pressure may be applied to ensure contact between apposing surfaces of the treated first plastic film and the second plastic film. The pressure may be maintained for a period of time necessary for the lamination to be achieved. For instance, lamination time may be between 2 hours and 24 hours. It can be appreciated, however, that the lamination time may be outside of the above-noted time range depending on the specific materials involved and the specific chemistry thereof.

Following lamination at step 235 of process 200, adhesion between layers of the functional laminate can be evaluated. In an example, it can be appreciated that the functional laminate may have an adhesion strength, or adhesion level, of between 5 N/inch and 80 N/inch or at any range and value therebetween including 5 N/inch to 10 N/inch, 10 N/inch to 15 N/inch, 15 N/inch to 20 N/inch, 20 N/inch to 25 N/inch, 25 N/inch to 30 N/inch, 30 N/inch to 35 N/inch, 35 N/inch to 40 N/inch, 40 N/inch to 45 N/inch, and 45 N/inch to 50 N/inch, 50 N/inch to 55 N/inch, 55 N/inch to 60 N/inch, 60 N/inch to 65 N/inch, 65 N/inch to 70 N/inch, 70 N/inch to 75 N/inch, and 75 N/inch to 80 N/inch, as measured by a pull-off adhesion test. Preferably, the adhesion strength of the functional laminate is greater than 20 N/inch.

Figure 2A:
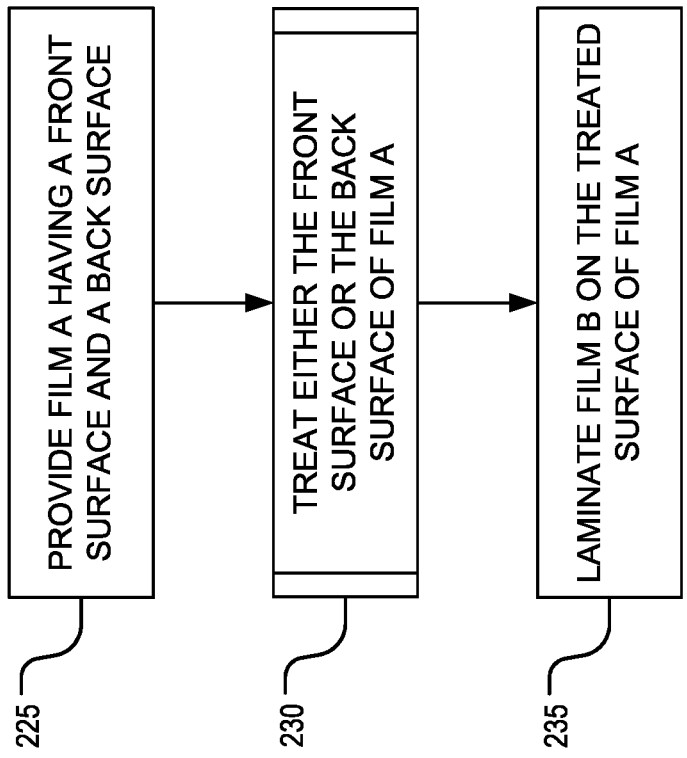
FIG. 2A is a flow diagram of a method of preparing a laminate or a laminated lens, according to an exemplary embodiment of the present disclosure.
Figure 2B:
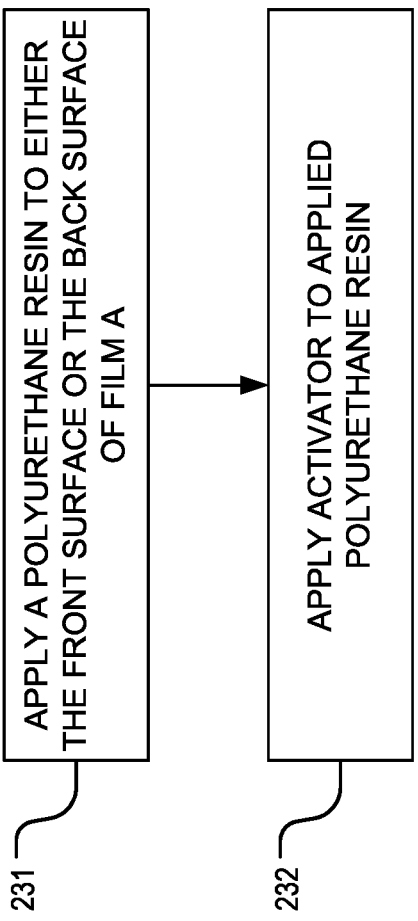
FIG. 2B is a flow diagram of a sub process of a method of preparing a laminate or a laminated lens, according to an exemplary embodiment of the present disclosure.

Turning now to FIG. 2B, sub process 230 of process 200 will now be described in greater detail.

At step 231 of sub process 230, a polyurethane resin, as the functional film and/or photochromic film, may be applied to the front surface of the first plastic film or the back surface of the first plastic film. In order to provide additional optical qualities, the polyurethane resin may comprise a dye. The dye may be one of a photochromic dye, a dichroic dye, a blue cut dye, an infrared cut dye, an ultraviolet cut dye, a selective wavelength cut dye, a color enhancement dye, a light filter dye, or combinations thereof. When applied, the polyurethane resin may have a thickness of between 0.5 µm and 500 µm. In an embodiment, the polyurethane resin may be a polyester polyurethane resin, a polyether polyurethane resin, or a polycaprolactone resin.

At step 232 of sub process 230, an activator may be applied to the polyurethane resin applied on the surface of the first plastic film. As introduced previously, the activator may be, in an example, an alcohol similar to that which is used for sterilizing medical equipment. The activator may, when advantageous, be a material that rids a surface of the polyurethane resin of debris. Application of the activator may be done as a wipe or a rinse, wherein at least a portion of residue of the activator is eliminated, by evaporation or similar, prior to lamination.

According to an embodiment, the activator may be a combination of alcohol and water. The combination of alcohol and water ensures that at least a portion of the activator will remain during lamination. In this way, the activator includes water in order to reduce air pockets formed between the surfaces of the first plastic film and the second plastic film during lamination. In an embodiment, the activator may be pure alcohol and water may be applied after application of the activator in order to reduce air pockets formed during lamination between the surfaces of the first plastic film and the second plastic film.

According to an embodiment, the activator may be, among others, IPA, ethanol, and methanol, or a combination of IPA and water, ethanol and water, or methanol and water. In an embodiment, the activator is IPA containing between 60 v/v % and 90 v/v % alcohol in purified water.

In an embodiment, the treatment of the first plastic film described in sub process 230 of process 200 may enable the formation of hydrogen bonds at an interface between the first plastic film and the second plastic film at step 235 of process 200. The improved hydrogen bonding between the first plastic film and the second plastic film, which may be based on a purity of the polyurethane resin, results in an improved adhesion between the first plastic film and the second plastic film when compared with laminates produced using conventional methods.

Turning now to FIG. 3, an illustration of the flow diagrams of FIG. 2A and FIG. 2B is shown. A surface of a first plastic film 311 may be treated at sub process 230 of process 200. The treatment may include, for instance, application of a functional film and/or photochromic film 320 to the surface of the first plastic film 311. The treated surface of the first plastic film 311 may be apposed with a surface of a second plastic film 312. The apposition may occur under pressure in order to laminate, at step 235 of process 200, the first plastic film 311, the functional film and/or photochromic film 320, and the second plastic film 312.

The method described above applies a functional film and/or photochromic film to a surface on only one of either the first plastic film or the second plastic film. Accordingly, it can be appreciated that adhesion therebetween may be modified by applying the functional film and/or photochromic film to apposing surfaces of both the first plastic film and the second plastic film. While adhesion achieved during the above-described lamination process of FIG. 2A, FIG. 2B, and FIG. 3 is sufficient for use in lens applications following injection molding or casting, FIG. 4A, FIG. 4B, and FIG. 5 describe a lamination process wherein a surface of each of the first plastic film and the second plastic film is treated in order to tailor the mechanical properties to needs of a specific task.

Figure 4A:
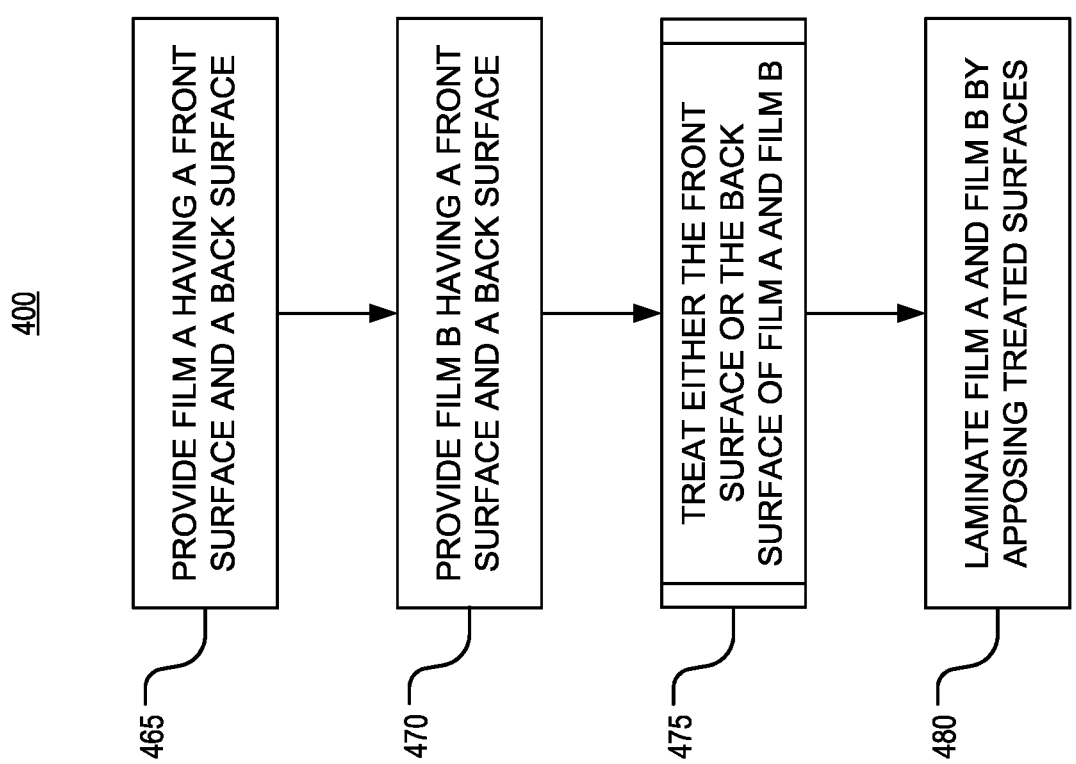
FIG. 4A is a flow diagram of a method of preparing a laminate or a laminated lens, according to an exemplary embodiment of the present disclosure.

Referring now to FIG. 4A, process 400 provides a flow diagram for generating a flat laminate wafer, as introduced in FIG. 1, without the need for heat curing, UV curing, and the like, wherein a functional TPU film is applied to a surface of each of a first plastic film and a second plastic film.

At step 465 of process 400, a first plastic film, or first plastic substrate, having a front surface and a back surface, may be provided. In an embodiment, the first plastic film may be PC, PMMA, TAC, OCO, PET, polyamide Nylon, allyl diglycol carbonate, thio-urethane copolymer, poly-acrylate, poly-episulfide, polyepoxy, polyamide, or combinations thereof.

At step 470 of process 400, a second plastic film, or second plastic substrate, having a front surface and a back surface, may be provided. In an embodiment, the second plastic film may be PC, PMMA, TAC, OCO, PET, polyamide Nylon, allyl diglycol carbonate, thio-urethane copolymer, poly-acrylate, poly-episulfide, polyepoxy, polyamide, or combinations thereof.

At sub process 475 of process 400, the front surface of the first plastic film or the back surface of the first plastic film may be treated and the front surface of the second plastic film or the back surface of the second plastic film may be treated. In an embodiment, treatment may include application of a functional film and/or photochromic film that provides additional optical qualities. The functional film and/or photochromic film may be applied to the front surface of the first plastic film or the back surface of the first plastic film and the front surface of the second plastic film or the back surface of the second plastic film by extrusion, coating, pre-lamination, and the like. In an embodiment, treatment may include application of an activator to the front surface of the first plastic film or the back surface of the first plastic film and the front surface of the second plastic film or the back surface of the second plastic film. In an embodiment, treatment may include application of an activator to the applied functional film and/or photochromic film. The activator may be, in an example, an alcohol similar to that which is used for sterilizing medical equipment. Sub process 475 of process 400 will be described in further detail with reference to FIG. 4B.

At step 480 of process 400, lamination of the first plastic film and the second plastic film may occur by apposition of the treated surface of the first plastic film and the treated surface of the second plastic film.

According to an embodiment, laminating may be performed at room temperature (e.g., 25° C.) and under a pressure of between 2 psi and 80 psi or, more preferably, between 2 psi and 30 psi. Pressure may be applied to ensure contact between apposing treated surfaces of the first plastic film and the second plastic film. The pressure may be maintained for a period of time necessary for the lamination to be achieved. For instance, lamination time may be between 2 hours and 24 hours. It can be appreciated, however, that the lamination time may be outside of the above-noted time range depending on the specific materials involved and the specific chemistry thereof.

Following lamination at step 480 of process 400, adhesion between layers of the functional laminate can be evaluated. In an example, it can be appreciated that the functional laminate may have an adhesion strength, or adhesion level, of between 5 N/inch and 80 N/inch or at any range and value therebetween including 5 N/inch to 10 N/inch, 10 N/inch to 15 N/inch, 15 N/inch to 20 N/inch, 20 N/inch to 25 N/inch, 25 N/inch to 30 N/inch, 30 N/inch to 35 N/inch, 35 N/inch to 40 N/inch, 40 N/inch to 45 N/inch, and 45 N/inch to 50 N/inch, 50 N/inch to 55 N/inch, 55 N/inch to 60 N/inch, 60 N/inch to 65 N/inch, 65 N/inch to 70 N/inch, 70 N/inch to 75 N/inch, and 75 N/inch to 80 N/inch, as measured by a pull-off adhesion test. Preferably, the adhesion strength of the functional laminate is greater than 20 N/inch.

Figure 4B:
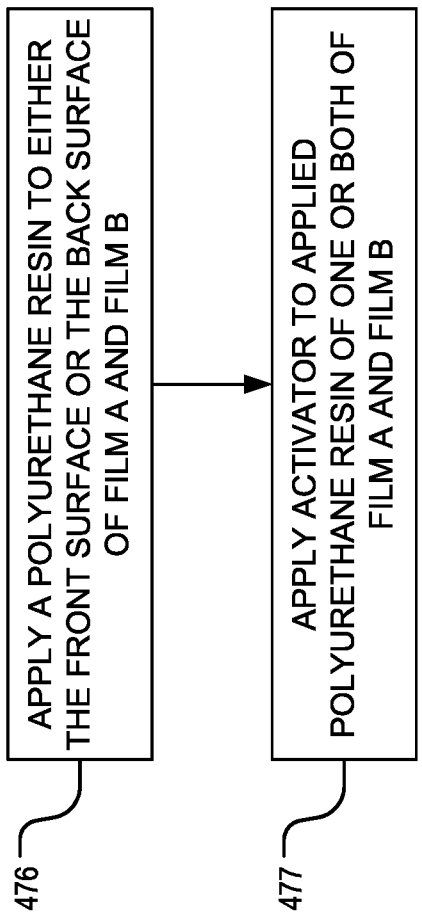
FIG. 4B is a flow diagram of a sub process of a method of preparing a laminate or a laminated lens, according to an exemplary embodiment of the present disclosure.

Turning now to FIG. 4B, sub process 475 of process 400 will now be described in greater detail.

Similar to FIG. 2B, at step 476 of sub process 475, a polyurethane resin, as the functional film and/or photochromic film, may be applied to the front surface of the first plastic film or the back surface of the first plastic film and the front surface of the second plastic film and the back surface of the second plastic film. In order to provide additional optical qualities, the polyurethane resin may comprise a dye. The dye may be one of a photochromic dye, a dichroic dye, a blue cut dye, an infrared cut dye, an ultraviolet cut dye, a selective wavelength cut dye, a color enhancement dye, a light filter dye, or combinations thereof. When applied, the polyurethane resin may have a thickness of between 0.5 µm and 500 µm. In an embodiment, the polyurethane resin may be a polyester polyurethane resin, a polyether polyurethane resin, or a polycaprolactone resin.

At step 477 of sub process 475, an activator may be applied to the polyurethane resin applied to the surface of the first plastic film and to the polyurethane resin applied to the surface of the second plastic film. As introduced previously, the activator may be, in an example, an alcohol similar to that which is used for sterilizing medical equipment. The activator may, when advantageous, be a material that rids of debris the polyurethane resin applied to the surface of the first plastic film and the polyurethane resin applied to the surface of the second plastic film. Application of the activator may be done as a wipe or a rinse, wherein at least a portion of residue of the activator is eliminated, by evaporation or similar, prior to lamination.

According to an embodiment, the activator may be a combination of alcohol and water. The combination of alcohol and water ensures that at least a portion of the activator will remain during lamination. In this way, the activator includes water in order to reduce air pockets formed during lamination between the treated surfaces of the first plastic film and the second plastic film. In an embodiment, the activator may be pure alcohol and water may be applied after application of the activator in order to reduce air pockets formed between the treated surfaces of the first plastic film and the second plastic film during lamination.

According to an embodiment, the activator may be, among others, IPA, ethanol, and methanol, or a combination of IPA and water, ethanol and water, or methanol and water. In an embodiment, the activator is IPA containing between 60 v/v % and 90 v/v % alcohol in purified water.

In an embodiment, the treatment of the first plastic film and the second plastic film described in sub process 475 of process 400 may enable the formation of hydrogen bonds at an interface between the treated surface of the first plastic film and the treated surface of the second plastic film at step 480 of process 400. The improved hydrogen bonding between the treated surfaces of the first plastic film and the second plastic film, which may be based on a purity of the polyurethane resin, results in an improved adhesion between the first plastic film and the second plastic film when compared with laminates produced using conventional methods.

Turning now to FIG. 5, an illustration of the flow diagrams of FIG. 4A and FIG. 4B is shown. A surface of a first plastic film 511 may be treated at sub process 475 of process 400. The treatment may include, for instance, application of a functional film and/or photochromic film 520 to the surface of the first plastic film 511 and activator application. Similarly, a surface of a second plastic film 512 may be treated at sub process 475 of process 400. The treatment may include, for instance, application of a functional film and/or photochromic film 520' to the surface of the second plastic film 512 and activator application. The treated surface of the first plastic film 511 may be apposed with the treated surface of the second plastic film 512. The apposition may occur under pressure in order to laminate, at step 480 of process 400, the first plastic film 511, the functional film and/or photochromic film(s) 520, 520', and the second plastic film 512.

It can be appreciated that, though the function of the functional laminate described above is provided by a polyurethane resin, it may well be the first plastic film and/or the second plastic film that provides the function. It may also be a combination thereof that provides the function.

Through implementation of the above-described method, many types of laminates may be made in a simple way without chemical adhesives, heating, and/or UV curing.

As part of the present disclosure, specific examples are included below. The examples are for illustrative purposes only and are not intended to limit the invention. In fact, the examples may not be exemplary embodiments of the present disclosure but instead examples intended to provide contrast between non-limiting examples of the present disclosure and other practices in the field. Those of ordinary skill in the art will readily recognize parameters that can be changed or modified to yield essentially the same results.

Reference to "overnight lamination" may be generally described as "Drying", as in FIG. 6. "Adhesion Types" may be analogous to "Activator Type". Such "Drying" may define a time period of drying as well as a pressure applied during the drying. For instance, the drying time period may be between 2 hours and 24 hours and the applied pressure may be between 3 psi and 30 psi. It can be appreciated that the above-defined ranges are merely exemplary ranges and that other ranges included or excluded from the above may be implemented in order to arrive at the flat laminated wafer described in the present disclosure.

Example 1

(Preparation of Photochromic PC-TPU-TPU-PC Laminate by IPA)

A photochromic TPU resin (Pellethane 80A 2363 with photochromic dyes from Transitions Inc) was extruded onto a polycarbonate film to obtain a PC-TPU film roll with the TPU thickness about 150 µm. Then, this film roll was die-cut into a 76 mm diameter wafer. After that, two TPU sides of the wafers were wiped with IPA and then laminated, in the presence of IPA, onto each other overnight under 30 psi at room temperature (e.g., 25° C.). No heat curing was applied. After about 24 hours, a photochromic PC-TPU-TPU-PC laminate wafer was obtained with strong adhesion between TPU-TPU and a peel force (i.e. adhesion level) above 50N/inch (see FIG. 6).

Example 2

(Preparation of Photochromic PC-TPU-TPU-PC Laminate by IPA+Water)

A photochromic TPU resin as in Example 1 was extruded onto a PC film to obtain a PC-TPU film roll. Then, this film roll was die-cut into a 76 mm diameter wafer. After that, two TPU sides were wiped with IPA and then laminated, in the presence of water, onto each other overnight under 30 psi at room temperature (e.g., 25° C.). No heat curing was applied. After about 24 hours, a photochromic PC-TPU-TPU-PC laminate wafer was obtained with strong adhesion between TPU & TPU and a peel force (i.e. adhesion level) above 25N/inch (see FIG. 6).

Example 3

(Preparation of Photochromic PC-TPU-TPU-PC Laminate by Methanol)

A photochromic TPU resin as in Example 1 was extruded onto a PC film as a PC-TPU film roll. Then, this film roll was die-cut into a 76 mm diameter wafer. After that, the TPU side was wiped by methanol and then laminated, in the presence of methanol, onto each other overnight under 30 psi at room temperature (e.g., 25° C.). No heat curing was applied. After about 24 hours, a photochromic PC-TPU-TPU-PC laminate wafer was obtained with strong adhesion between TPU-TPU and a peel force (i.e. adhesion level) above 50N/inch (see FIG. 6).

Example 4

(Preparation of Photochromic PC-TPU-PC Laminate for Injection Molding)

A photochromic TPU resin as in Example 1 was extruded onto a PC film as a PC-TPU film roll. Then, this film roll was die-cut into a 76 mm diameter wafer. After that, the TPU side was wiped with IPA and then laminated, in the presence of IPA and water, onto another PC film overnight under 30 psi at room temperature (e.g., 25° C.). No heat curing was applied. After about 24 hours, a photochromic PC-TPU-PC laminate wafer was obtained. The laminate wafer was then thermoformed using a LEMA machine to a 4.0D base wafer and then injection molded to obtain a PC photochromic semi-finished lens with very good adhesion. No delamination occurred during the surfacing process to −2.0D lens.

Example 5

(Preparation of Photochromic TPU-TPU Laminate with PET Release Liner)

Same photochromic TPU resin as in Example 1 was extruded onto a PET release liner to get a TPU film roll. After removal of the liner on one side, two TPU films were wiped by IPA and then laminated, in the presence of IPA, to each other overnight under 30 psi at room temperature (e.g., 25° C.). No heat curing was applied. After about 24 hours, a photochromic TPU-TPU laminate was obtained with very strong adhesion and a peel force (i.e. adhesion level) of approximately 50N/inch (see FIG. 6).

Comparative Example 1

(Preparation of Photochromic TPU-TPU Laminate with Silicone Release Liner)

Same photochromic TPU resin as in Example 1 was extruded onto a silicone release liner. After removal of the liner, two TPU films were wiped with IPA and then laminated, in the presence of IPA, to each other overnight under 30 psi at room temperature (e.g., 25° C.). No heat curing was applied. Due to the presence of silicone traces on the TPU surface, adhesion at the TPU-TPU interface was very poor and exhibited a peel force (i.e. adhesion level) of approximately 0 N/inch.

Comparative Example 2

(Preparation of Photochromic TPU-TPU Laminate with Water Only)

Same photochromic TPU resin as in Example 1 was extruded onto a PC film as a PC-TPU film roll. Then, this film roll was die-cut into a 76 mm diameter wafer. After that, the TPU side was wiped by water and then laminated, in the presence of water, onto each other overnight under 30 psi at room temperature (e.g., 25° C.). No heat curing was applied. Due to the presence of water on the TPU surface, adhesion at the TPU-TPU interface was very poor and exhibited a peel force (i.e. adhesion level) of approximately 0 N/inch (see FIG. 6).

Comparative Example 3

(Preparation of Photochromic TPU-TPU Laminate with Corona Treating+Water)

Same photochromic TPU resin as in comparative Example 2 was extruded onto a PC film as a PC-TPU film roll. Then, this film roll was die-cut into a 76 mm diameter wafer. After that, the TPU side was treated by corona (for adhesion promotion purpose) and then laminated, in the presence of water, onto each other overnight under 30 psi at room temperature (e.g., 25° C.). No heat curing was applied. Due to the presence of water on the TPU surface, adhesion at the TPU-TPU interface was very poor and exhibited a peel force (i.e. adhesion level) of approximately 0 N/inch (see FIG. 6).

Comparative Example 4

(Preparation of Photochromic TPU-TPU Laminate with IPA+Water Based HMA)

Same photochromic TPU resin as in comparative Example 2 was extruded onto a PC film as a PC-TPU film roll. Then, this film roll was die-cut into a 76 mm diameter wafer. After that, two TPU sides were wiped with IPA and then laminated, in the presence of water-based hot-melt adhesive (HMA) (UD-104 from Bondpolymer Inc), onto each other overnight under 30 psi at room temperature (e.g., 25° C.). No heat curing was applied. Due to the presence of water-based HMA on the TPU surface, adhesion at the TPU-TPU interface was very poor and exhibited a peel force (i.e. adhesion level) of approximately 0 N/inch (see FIG. 6).

According to an embodiment, methods of the present disclosure can be implemented within roll-to-roll manufacturing of photochromic laminates. These laminates can then be used in traditional injection molding process to make photochromic semi-finished or finished lenses with high photochromic performance.

According to an embodiment, methods of the present disclosure can be implemented at a small scale (e.g. within a retail store or in a laboratory), as the processes described therein do not require heat and/or UV radiation.

According to an embodiment, methods of the present disclosure can be implemented within other film lamination technology to make added value laminates for optical lens applications, including clear to Polar laminate, photochromic laminate, or other optical functional laminates such as optical micro-structure laminate.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A method of preparing a laminate, comprising obtaining a first plastic substrate having a front surface and a back surface, treating the front surface of the first plastic substrate or the back surface of the first plastic substrate, and laminating a second plastic substrate on the treated front surface of the first plastic substrate or the treated back surface of the first plastic substrate.

(2) The method of (1), wherein the treating includes applying a polyurethane resin to the front surface of the first plastic substrate or the back surface of the first plastic substrate.

(3) The method of either (1) or (2), wherein the applied polyurethane resin is a polyester polyurethane resin, a polyether polyurethane resin, or a polycaprolactone resin.

(4) The method of any one of (1) to (3), wherein the applied polyurethane resin contains at least one dye selected from a group consisting of a photochromic dye, a dichroic dye, a blue cut dye, an infrared cut dye, an ultraviolet cut dye, a selective wavelength cut dye, a color enhancement dye, and a light filter dye.

(5) The method of any one of (1) to (4), wherein the applied polyurethane resin has a thickness of between 0.5 microns to 500 microns.

(6) The method of any one of (1) to (5), where the treating includes applying isopropyl alcohol or methanol, in combination with water, to the applied polyurethane resin.

(7) The method of any one of (1) to (5), where the treating includes applying isopropyl alcohol, ethanol, or methanol to the applied polyurethane resin, preferably the treating includes applying isopropyl alcohol in combination with water, ethanol in combination with water, or methanol in combination with water, to the applied polyurethane resin (8) The method of any one of (1) to (7), wherein the laminating is performed at room temperature.

(9) The method of any one of (1) to (8), wherein the laminating is performed under 2 to 30 psi.

(10) The method of any one of (1) to (9), wherein the first plastic substrate comprises at least one selected from a group consisting of polycarbonate, cellulose triacetate, polymethyl methacrylate, polyamide, polyethylene terephthalate, cyclic olefin copolymer, Nylon, allyl diglycol carbonate, thio-urethane copolymer, poly-acrylate, poly-episulfide, polyepoxy, and polyamide.

(11) The method of any one of (1) to (10), wherein the second plastic substrate comprises at least one selected from a group consisting of polycarbonate, cellulose triacetate, polymethyl methacrylate, polyamide, polyethylene terephthalate, cyclic olefin copolymer, Nylon, allyl diglycol carbonate, thio-urethane copolymer, poly-acrylate, poly-episulfide, polyepoxy, and polyamide.

(12) The method of any one of (1) to (11), wherein the treating of the front surface of the first plastic substrate or the back surface of the first plastic substrate permits formation of hydrogen bonds at an interface between a treated surface of the first plastic substrate and the second plastic substrate.

(13) The method of any one of (1) to (12), wherein the obtained first plastic substrate and the second plastic substrate each have a thickness of between 20 microns and 10 millimeters.

(14) The method of any one of (1) to (13), further comprising treating a front surface of the second plastic substrate or a back surface of the second plastic substrate, wherein the laminating includes apposing the treated front surface of the first plastic substrate or the treated back surface of the first plastic substrate and the treated front surface of the second plastic substrate or the treated back surface of the second plastic substrate.

(15) The method of any one of (1) to (14), wherein the treating includes applying a polyurethane resin to the front surface of the first plastic substrate or the back surface of the first plastic substrate, applying a polyurethane resin to the front surface of the second plastic substrate or the back surface of the second plastic substrate, and applying isopropyl alcohol or methanol, in combination with water, to the applied polyurethane resin of the first plastic substrate and the applied polyurethane resin of the second plastic substrate.

(16) The method of any one of (1) to (15), wherein the polyurethane resin comprises at least one dye selected from a group consisting of a photochromic dye, a dichroic dye, a blue cut dye, an infrared cut dye, an ultraviolet cut dye, a selective wavelength cut dye, a color enhancement dye, and a light filter dye.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of preparing a laminate, comprising:
   obtaining a first plastic substrate having a front surface and a back surface;
   treating the front surface of the first plastic substrate or the back surface of the first plastic substrate; and
   laminating a second plastic substrate on the treated front surface of the first plastic substrate or the treated back surface of the first plastic substrate;
   wherein treating the front surface of the first plastic substrate or the back surface of the first plastic substrate includes applying a polyurethane resin to the front surface of the first plastic substrate or the back surface of the first plastic substrate and applying isopropyl alcohol, ethanol, or methanol to the applied polyurethane resin; and
   wherein the method is implemented without chemical adhesives.

2. The method of claim 1, wherein the applied polyurethane resin is a polyester polyurethane resin, or a polyether polyurethane resin.

3. The method of claim 1, wherein the applied polyurethane resin contains at least one dye selected from a group consisting of a photochromic dye, a dichroic dye, a blue cut dye, an infrared cut dye, an ultraviolet cut dye, a selective wavelength cut dye, a color enhancement dye, and a light filter dye.

4. The method of claim 1, wherein the applied polyurethane resin has a thickness of between 0.5 microns to 500 microns.

5. The method of claim 1, wherein the treating includes applying isopropyl alcohol in combination with water, ethanol in combination with water, or methanol in combination with water to the applied polyurethane resin.

6. The method of claim 1, wherein the laminating is performed at room temperature.

7. The method of claim 1, wherein the laminating is performed under 2 to 30 psi.

8. The method of claim 1, wherein the first plastic substrate comprises at least one selected from a group consisting of polycarbonate, cellulose triacetate, polymethyl methacrylate, polyamide, polyethylene terephthalate, cyclic olefin copolymer, Nylon, allyl diglycol carbonate, thiourethane copolymer, poly-acrylate, poly-episulfide, polyepoxy, and polyamide.

9. The method of claim 1, wherein the second plastic substrate comprises at least one selected from a group consisting of polycarbonate, cellulose triacetate, polymethyl methacrylate, polyamide, polyethylene terephthalate, cyclic olefin copolymer, Nylon, allyl diglycol carbonate, thiourethane copolymer, poly-acrylate, poly-episulfide, polyepoxy, and polyamide.

10. The method of claim 1, wherein the treating of the front surface of the first plastic substrate or the back surface of the first plastic substrate permits formation of hydrogen bonds at an interface between a treated surface of the first plastic substrate and the second plastic substrate.

11. The method of claim 1, wherein the obtained first plastic substrate and the second plastic substrate each have a thickness of between 20 microns and 10 millimeters.

12. The method of claim 1, further comprising:
    treating a front surface of the second plastic substrate or a back surface of the second plastic substrate, wherein the laminating includes apposing the treated front surface of the first plastic substrate or the treated back surface of the first plastic substrate and the treated front surface of the second plastic substrate or the treated back surface of the second plastic substrate.

13. The method of claim 12, wherein treating a front surface of the second plastic substrate or a back surface of the second plastic substrate includes:
    applying a polyurethane resin to the front surface of the second plastic substrate or the back surface of the second plastic substrate; and
    applying isopropyl alcohol or methanol, in combination with water, to the applied polyurethane resin of the second plastic substrate.

14. The method of claim 13, wherein the polyurethane resin comprises at least one dye selected from a group consisting of a photochromic dye, a dichroic dye, a blue cut dye, an infrared cut dye, an ultraviolet cut dye, a selective wavelength cut dye, a color enhancement dye, and a light filter dye.

* * * * *